(12) United States Patent
Bae et al.

(10) Patent No.: US 12,099,537 B2
(45) Date of Patent: Sep. 24, 2024

(54) ELECTRONIC DEVICE, CONTENTS SEARCHING SYSTEM AND SEARCHING METHOD THEREOF

(71) Applicant: SAMSUNG ELECTRONICS CO., LTD., Suwon-si (KR)

(72) Inventors: Jongjin Bae, Suwon-si (KR); Keejun Han, Suwon-si (KR); Mingyu Lee, Suwon-si (KR); Sunghoon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/532,250

(22) Filed: Nov. 22, 2021

(65) Prior Publication Data

US 2022/0092099 A1   Mar. 24, 2022

Related U.S. Application Data

(63) Continuation of application No. PCT/KR2021/012554, filed on Sep. 15, 2021.

(30) Foreign Application Priority Data

Sep. 21, 2020 (KR) ........................ 10-2020-0121710

(51) Int. Cl.
 *G06F 16/33* (2019.01)
 *G06N 20/00* (2019.01)
(52) U.S. Cl.
 CPC ...... *G06F 16/3347* (2019.01); *G06F 16/3344* (2019.01); *G06N 20/00* (2019.01)
(58) Field of Classification Search
 None
 See application file for complete search history.

(56) References Cited

U.S. PATENT DOCUMENTS 8,229,900 B2   7/2012   Houle
10,984,337 B2  4/2021   Bai et al.
(Continued)

FOREIGN PATENT DOCUMENTS

CN   111143684   5/2020
JP   2008-191702   8/2008
(Continued)

OTHER PUBLICATIONS

International Search Report and Written Opinion dated Dec. 16, 2021 in corresponding International Application No. PCT/KR2021/012554.

*Primary Examiner* — Scott A. Waldron
(74) *Attorney, Agent, or Firm* — Nixon & Vanderhye, P.C.

(57) ABSTRACT

Disclosed are an electronic device, a contents searching system, and a searching method. The method for searching contents of an electronic device includes: creating a keyword vector by extracting a keyword for searching; obtaining a searching contents candidate group based on a first similarity between contents indexing data created by a preset natural language processing-based search model and the created keyword vector; obtaining a second similarity between the created keyword vector and vector data included in the searching contents candidate group based on a trained artificial intelligence model; and aligning and providing contents included in the searching contents candidate group based on the obtained first similarity and the second similarity.

13 Claims, 7 Drawing Sheets

(56) References Cited

U.S. PATENT DOCUMENTS

| | | | |
|---|---|---|---|
| 2008/0077570 A1* | 3/2008 | Tang | G06F 16/951 |
| | | | 707/999.005 |
| 2011/0224982 A1* | 9/2011 | Acero | G10L 15/08 |
| | | | 704/236 |
| 2016/0314206 A1 | 10/2016 | Cox et al. | |
| 2018/0365248 A1 | 12/2018 | Zheng | |
| 2020/0073953 A1* | 3/2020 | Kulkarni | G06N 3/084 |
| 2020/0134012 A1 | 4/2020 | Zakharov et al. | |
| 2021/0334300 A1* | 10/2021 | Banda | G06N 3/08 |

FOREIGN PATENT DOCUMENTS

| | | |
|---|---|---|
| JP | 2019-149140 | 9/2019 |
| JP | 2020-042770 | 3/2020 |
| KR | 10-1999-0071354 | 9/1999 |
| KR | 10-2013-0059792 | 6/2013 |
| KR | 10-1508583 | 4/2015 |
| KR | 10-2018-0075234 | 7/2018 |
| KR | 10-2036394 | 11/2019 |
| KR | 10-2059743 | 12/2019 |

\* cited by examiner

ELECTRONIC DEVICE, CONTENTS SEARCHING SYSTEM AND SEARCHING METHOD THEREOF

CROSS-REFERENCE TO RELATED APPLICATIONS

This application is a continuation of International Application No. PCT/KR2021/012554 designating the United States, filed on Sep. 15, 2021, in the Korean Intellectual Property Receiving Office and claiming priority to Korean Patent Application No. 10-2020-0121710, filed Sep. 21, 2020, in the Korean Intellectual Property Office, the disclosures of which are incorporated by reference herein in their entireties.

BACKGROUND

1. Field

This disclosure relates to an electronic device, a contents searching system, and a searching method thereof and, for example, to a contents searching system and a searching method for extracting meaningful information from a user query and searching for contents based on a trained artificial intelligence (AI) model.

2. Description of Related Art

As the various contents are created, an amount of accessible contents is exponentially increasing. A user wishes to search necessary contents among many contents. Accordingly, research on the technology of searching for contents has been actively performed.

In general, a search service receives a query from a user, searches contents based on the received query, and provides the searched contents. However, a search service that searches based simply on a query often includes contents which a user does not wish to search.

A technology for providing a search service based on a trained artificial intelligence model has been proposed. However, in the case of a search service provided based on an artificial intelligence model, it is a method of searching contents including a lot of individual keywords included in a query and there is a disadvantage in that, in the case of a search service provided based on an artificial intelligence model, a user does not provide desired contents in case of cultural contents such as movies, music, and the like.

Therefore, there is a necessity of an art to search and provide contents desired by a user in consideration of awareness of contents, instead of searching for contents including a lot of keywords.

SUMMARY

Embodiments of the disclosure provide an electronic device, a contents searching system, and a searching method for searching contents in consideration of a level of awareness.

According to an example embodiment, a method for searching contents of an electronic device includes: creating a keyword vector by extracting a keyword provided for searching; obtaining a searching contents candidate group based on a first similarity between contents indexing data created by a preset natural language processing-based search model and the created keyword vector; obtaining a second similarity between the created keyword vector and vector data included in the searching contents candidate group based on a trained artificial intelligence model; and aligning and providing contents included in the searching contents candidate group based on the obtained first similarity and the second similarity.

The method may further include: obtaining a text comprising information of at least one of a title, genre, actor, director, synopsis, or opening date of contents; extracting a keyword from the obtained text; obtaining term frequency and inverse document frequency of the extracted keyword; and creating the preset natural language processing-based searching model by obtaining contents indexing data based on the obtained term frequency and the inverse document frequency.

The contents indexing data may include a plurality of fields, and the obtaining the searching contents candidate group may include assigning a weight to at least one field among the plurality of fields.

The method may further include: obtaining a text comprising information of at least one of a title, genre, actor, director, synopsis, or opening date of contents; creating a plurality of sentences based on a keyword extracted from the obtained text; calculating a score based on a similarity between the plurality of created sentences; identifying a preset number of sentences in which the calculated score is high (e.g., higher than a specified threshold); creating the preset number of identified sentences as vector data of the contents; and training the artificial intelligence model based on learning data comprising vector data of the created contents.

The training the artificial intelligence model may include training by inputting the learning data in which a vector data of the created contents and corresponding user query are in one pair.

The training the artificial intelligence model may include: adding a position embedding value to maintain an order of a keyword included in vector data of the created contents; and inputting, to the artificial intelligence model, the learning data which connects the vector data of the contents and the user query.

The creating the keyword vector may include, based on the provided query being a voice: identifying an error of the recognized text based on similarity between the text recognized in the provided voice and prestored query data, and modifying an error of the identified text.

According to an example embodiment, an electronic device includes: an input interface comprising input circuitry configured to receive a query for searching; an output interface comprising output circuitry; and a processor, the processor may be configured to: create a keyword vector by extracting a keyword from the provided query, obtain a searching contents candidate group based on a first similarity between contents indexing data created by a preset natural language processing-based search model and the created keyword vector, obtain a second similarity between the created keyword vector and vector data included in the searching contents candidate group based on a trained artificial intelligence model, align contents included in the searching contents candidate group based on the obtained first similarity and the second similarity, and control the output interface to provide the aligned contents.

The processor may be configured to: obtain a text comprising information of at least one of a title, genre, actor, director, synopsis, or opening date of contents, extract a keyword from the obtained text, obtain term frequency and inverse document frequency of the extracted keyword, and create the preset natural language processing-based searching model by obtaining contents indexing data based on the obtained term frequency and the inverse document frequency.

The contents indexing data may include a plurality of fields, and the processor may be configured to obtain the searching contents candidate group by assigning a weight to at least one field among the plurality of fields.

The processor may be configured to: obtain a text comprising information of at least one of a title, genre, actor, director, synopsis, or opening date of contents, create a plurality of sentences based on a keyword extracted from the obtained text, calculate a score based on a similarity between the plurality of created sentences, identify a preset number of sentences in which the calculated score is high (e.g., higher than a specified threshold), create the preset number of identified sentences as vector data of the contents, and train the artificial intelligence model based on learning data comprising vector data of the created contents.

The processor may be configured to: train the artificial intelligence model by inputting the learning data in which a vector data of the created contents and corresponding user query are in one pair.

The processor may be configured to: add a position embedding value to maintain an order of a keyword included in vector data of the created contents and input, to the artificial intelligence model, the learning data which connects the vector data of the contents and the user query.

The processor may, based on the provided query being a voice, be configured to: identify an error of the recognized text based on similarity between the text recognized in the provided voice and prestored query data, and modify an error of the identified text.

According to an example embodiment, a contents searching system comprising a terminal device and a server includes: a terminal device comprising circuitry configured to: receive a query for searching and transmit the query to the server; and a server configured to: receive the query for searching from the terminal device, and the server may be further configured to: create a keyword vector by extracting a keyword from the provided query, obtain a searching contents candidate group based on a first similarity between contents indexing data created by a preset natural language processing-based search model and the created keyword vector, obtain a second similarity between the created keyword vector and vector data included in the searching contents candidate group based on a trained artificial intelligence model, align contents included in the searching contents candidate group based on the obtained first similarity and the second similarity, and transmit the aligned contents to the terminal device, and the terminal device may output the aligned contents received from the server.

The server may obtain a text comprising information of at least one of a title, genre, actor, director, synopsis, or opening date of contents; extracting a keyword from the obtained text; obtaining term frequency and inverse document frequency of the extracted keyword and create the preset natural language processing-based searching model by obtaining contents indexing data based on the obtained term frequency and the inverse document frequency.

The contents indexing data may include a plurality of fields, and the server may obtain the searching contents candidate group by assigning a weight to at least one field among the plurality of fields.

The server may obtain a text comprising information of at least one of a title, genre, actor, director, synopsis, or opening date of contents, create a plurality of sentences based on a keyword extracted from the obtained text, calculate a score based on a similarity between the plurality of created sentences, identify a preset number of sentences in which the calculated score is high (e.g., higher than a specified threshold), create the preset number of identified sentences as vector data of the contents, and train the artificial intelligence model based on learning data comprising vector data of the created contents.

The server may learn by inputting, into the artificial intelligence model, the learning data, in which the vector data of the created contents and the corresponding user query are in one pair.

The server may add a position embedding value to maintain the sequence of keywords included in the generated vector data, and input the learning data connecting the vector data of the content and the query of the user into the artificial intelligence model.

According to various example embodiments, the electronic device, the contents searching system, and the searching method may search and provide optimal and/or improved contents to a user in consideration of degree of awareness.

The effects and advantages of various example embodiments of the disclosure are not limited to the above-mentioned effects, and other effects not mentioned may be clearly understood by a person skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
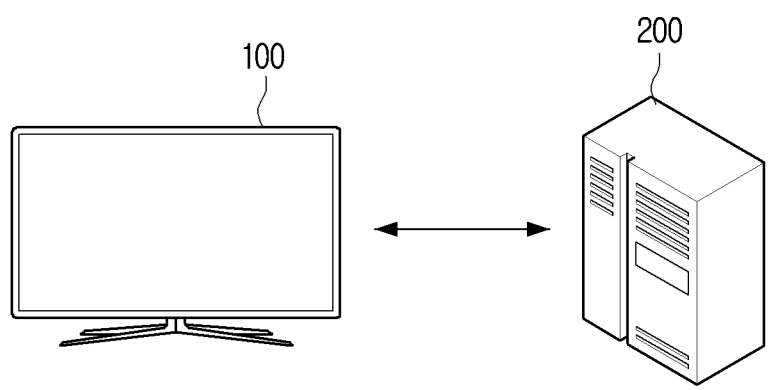
FIG. 1 is a diagram illustrating an example contents searching system according to various embodiments.

Hereinafter, various example embodiments will be described in greater detail with reference to the accompanying drawings. The embodiments described herein may be variously modified. Example embodiments are depicted in the drawings and may be described in detail in the description of the disclosure. However, it is to be understood that the example embodiments disclosed in the appended drawings are for ease of understanding of various embodiments. Therefore, it is intended that the disclosure not be limited to the particular embodiments disclosed in the accompanying drawings, but on the contrary, the intention is to cover all equivalents or alternatives falling within the spirit and scope of the disclosure.

Terms such as "first," "second," and the like may be used to describe various components, but the components should not be limited by the terms. The terms are used to distinguish a component from another.

In this disclosure, the terms "comprises" or "having" and the like are used to specify that there is a feature, number, step, operation, element, part or combination thereof described in the disclosure, but do not preclude the presence or addition of one or more other features, numbers, steps, operations, elements, parts, or combinations thereof. It is to be understood that when an element is referred to as being "coupled" or "connected" to another element, it may be directly coupled or connected to the other element, or any other element may be interposed therebetween. When an element is referred to as being "directly coupled" or "directly connected" to another element, it should be understood that no other element is present therebetween.

In the disclosure, a "module" or a "~er/~or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware. Singular forms are intended to include plural forms unless the context clearly indicates otherwise.

In the disclosure, the order of each step or operation should be understood nonrestrictively unless a preceding step or operation must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is may refer to both A and B being included, as well as selectively indicating any one of A and B. Also, the term "including" in this disclosure has a comprehensive meaning to further include another component in addition to elements enumerated to be included.

In this disclosure, components necessary for the description of the disclosure are described and components not related to the essence of the disclosure may be omitted. The disclosed and described components should not be construed to be included in an exclusive sense but should be understood to be presented in a non-exclusive sense to include any other component.

When it is decided that a detailed description for the known art related to the disclosure may unnecessarily obscure the gist of the disclosure, the detailed description may be reduced or omitted. While each embodiment may be implemented or operated independently, each embodiment may be implemented or operated in combination. On the other hand, each embodiment may be implemented or operated independently, but each embodiment may be implemented or operated in combination FIG. 1 is a diagram illustrating an example contents searching system according to various embodiments.

Referring to FIG. 1, the content search system may include a terminal device 100 and a server 200.

The terminal device 100 receives a query for searching contents from, for example, a user. For example, the terminal device 100 may receive a query through text, voice, gesture, etc. from a user. The terminal device 100 may transmit an input query to the server 200.

The server 200 may receive the user query from the terminal device 100 and search the contents based on the received query of the user. The server 200 may search for content using a preset natural language processing-based search model and an artificial intelligence (AI) model. For example, the server 200 may include a preset natural language processing-based search model and a trained AI model for searching contents. According to an embodiment, the natural language processing-based search model may include, for example, and without limitation, a bag-of-word, word2vec, doc2vec, or the like. The AI model may include, for example, and without limitation, Embedding from Language Models (ELMo), Bidirectional Encoder Representations from Transformers (BERT), or the like.

The server 200 may receive a user query and may create a natural language processing-based search model before searching the contents. In an embodiment, the server 200 may obtain text including information such as title, genre, actor, director, synopsis, opening date of the contents, or the like. The server 200 may extract a keyword from the obtained text. The keyword may refer, for example, to a word representing the core concept of the contents. The server 200 may obtain a term frequency and an inverse document frequency of the extracted keyword. The term frequency of the keyword may refer, for example, to the number of keywords included in the contents. The inverse document frequency may refer, for example, to how common a keyword appears in the entire contents. The server 200 may obtain content indexing data (vector data) based on the term frequency and the inverse document frequency. The server 200 may repeat the above-described process for all contents to obtain content indexing data for each content. The server 200 may create a natural language processing-based search model based on the content indexing data obtained for each content.

The content indexing data may include a plurality of fields. As described above, the server 200 may extract a keyword from text including information such as title, genre, actor, director, synopsis, opening date of the contents to obtain the content indexing data. Accordingly, each of the plurality of fields of the content indexing data may include data related to information such as title, genre, actor, director, synopsis, or opening date of the contents. The server 200 may search the contents by assigning weights to some fields in the contents searching process. According to an embodiment, when information related to a person is included in a user query, the server 200 may assign a weight to a field corresponding to the actor and director to search the contents. When information related to a user query is included, a weight may be assigned to a field corresponding to a synopsis to search the contents.

The server 200 may train an AI model. In an embodiment, the server 200 may obtain text that includes at least one of title, genre, actor, director, synopsis, or opening date of the contents. The server 200 may extract a keyword from the obtained text. The server 200 may create a plurality of sentences (or word segments) based on the extracted keyword. The server 200 may calculate a score based on the similarity between the created sentences and identify a predetermined number of sentences having a high score. The server 200 may create the identified predetermined number of sentences as vector data and may create learning data including vector data of the created content.

According to an embodiment, the server 200 may create learning data in which vector data of the created contents and corresponding user query are in one pair. The server 200 may add a position embedding value for maintaining the sequence of keywords included in the vector data of the created contents, and may create the learning data by connecting the vector data of the content and the query of the user. The server 200 may input the created learning data into an AI model to train the AI model.

In an embodiment, the server 200 may train the natural language processing-based search model and the artificial intelligence model, but the natural language processing-based search model and the artificial intelligence model may be created and trained in a separate external device. For example, the external device may be a search model server or a search model cloud. The server 200 may create a natural language processing-based search model or train an artificial intelligence model in association with a search model cloud. The server 200 may receive a natural language processing-based search model or a trained artificial intelligence model created by the search model server.

As described above, the server 200 including a natural language processing-based search model and an artificial intelligence model may receive a user query from the terminal device 100. The natural language processing-based search model of the server 200 may extract a keyword from the input user query and may convert the extracted keyword into a number. The natural language processing-based search model of the server 200 may create the keyword vector from the user query. The server 200 may identify a first similarity between the content indexing data of the natural language processing-based search model and the keyword vector. The server 200 may obtain a search content candidate group based on the identified first similarity. The search content candidate group may include a plurality of content based on the first similarity. For example, the server 200 may limit the contents to be included in the search content candidate group with the number or the first similarity. In an embodiment, the server 200 may set the contents to be included in the search content candidate group as 100. In this example, the server 200 may obtain a search content candidate group including 100 contents in the order from the contents having higher first similarity to lower first similarity. The server 200 may set the first similarity of the contents to be included in the search content candidate group as 0.5. In this example, the server 200 may obtain a search content candidate group including content having a first similarity greater than or equal to 0.5.

The server 200 may identify a second similarity between the created keyword vector based on the trained AI model and the vector data of the content included in the search content candidate group. The server 200 may identify a second similarity for content included in the search content candidate group. The server 200 may align content included in the search content candidate group based on the obtained first similarity and the second similarity. The server 200 may transmit the aligned content (or contents and aligned data) to the terminal device 100. The terminal device 100 may output aligned content (retrieved content) received from the server 200. Alternatively, the terminal device 100 may align and output the content list based on the received content and the aligned data.

For example, the terminal device 100 may include, for example, and without limitation, a digital TV, a desktop computer, a laptop computer, a smart phone, a navigation, a slate personal computer (PC), a tablet PC, a wearable device, a kiosk, and the like. In addition, the server 200 may include, for example, and without limitation, a cloud server, a PC, and the like. The server 200 may include a plurality of servers, and the first server may perform first similarity identification, and the second server may perform second similarity determination. The first server may perform operations associated with the natural language processing-based search model, and the second server may perform operations associated with the artificial intelligence model.

The configuration of each device will be described in greater detail below with reference to various drawings.

Figure 2:
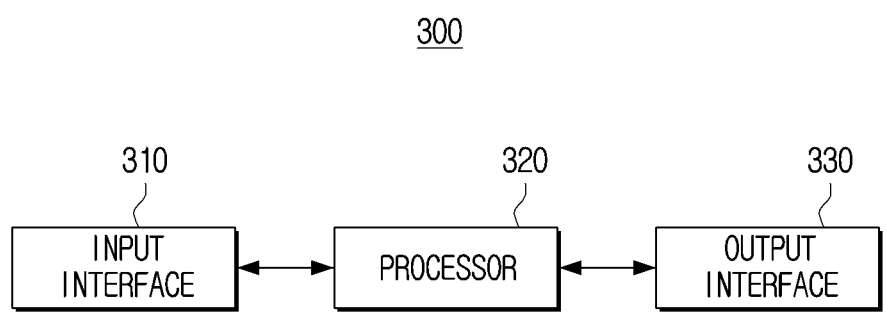
FIG. 2 is a block diagram illustrating an example configuration of an example electronic device according to various embodiments.

FIG. 2 is a block diagram illustrating an example configuration of an electronic device according to various embodiments.

Referring to FIG. 2, the electronic device 300 includes an input interface (e.g., including input circuitry) 310, a processor (e.g., including processing circuitry) 320, and an output interface (e.g., including output circuitry) 330. For example, the electronic device 300 may include, for example, and without limitation, a digital TV, a desktop computer, a laptop computer, a smart phone, a navigation, a slate PC, a tablet PC, a wearable device, a kiosk, and the like.

Referring to FIG. 1, a content search system is described. The content search system of FIG. 1 includes a terminal device and a server, and the server performs a content search operation. However, the content search operation may be performed at the terminal device. For example, the electronic device 300 of FIG. 2 may perform a content search process. For example, the content search process may be performed in a content search system including a terminal device and a server, and may be performed solely by the terminal device. FIG. 2 illustrates an example embodiment of performing a content search process using a terminal device.

The input interface 310 may include various input circuitry and receives a query for content searching from a user. For example, the input interface 310 may receive text, voice, gesture, etc. corresponding to a query from a user. The input interface 310 may be referred to as an input unit, an input module, or the like.

The processor 320 may include various processing circuitry and control each configuration of the electronic device 100. For example, the processor 320 may control the input interface 310 to receive a query from a user. As described above, the input interface 310 may receive text, voice, gesture, etc. from a user. The processor 320 may identify the user query from the input text, voice, gesture, and the like.

The processor 320 searches the content based on the input user query. The processor 320 may search the content using a preset natural language processing-based search model and an artificial intelligence model.

The processor 320 may create a natural language processing-based search model for receiving a user query and searching the contents. According to an embodiment, the processor 320 may obtain text including information such as title, genre, actor, director, synopsis, or opening date of the contents. The processor 320 may extract the keyword from the obtained text. The processor 320 may obtain the term frequency and the inverse document frequency of the extracted keyword. The processor 320 may obtain content indexing data (vector data) based on the term frequency and the inverse document frequency. The processor 320 may repeat the above-described process for all contents to obtain content indexing data for each content. The processor 320 may create a natural language processing based search model based on the content indexing data obtained for each of all contents.

The content indexing data may include a plurality of fields. As described above, the processor 320 may extract the keyword from text including information such as title, genre, actor, director, synopsis, or opening date of the contents.

Accordingly, each of the plurality of fields of the content indexing data may include data related to information such as title, genre, actor, director, synopsis, or opening date of the contents. In addition, the processor 320 may assign a weight to some fields in the content search process to search the contents. According to an embodiment, when information related to a person is included in a query of a user, the processor 320 may assign a weight to a field corresponding to the actor and the director to search the contents. When information related to a user query is included, a weight may be assigned to a field corresponding to a synopsis to search the contents.

The processor 320 may train an AI model. According to an embodiment, the processor 320 may obtain text that includes at least one of title, genre, actor, director, synopsis, or opening date of the contents. The processor 320 may extract the keyword from the obtained text. The processor 320 may create a plurality of sentences (or word segments) based on the extracted keyword. The processor 320 may calculate a score based on the similarity between the created plurality of sentences and may identify a predetermined number of sentences having a high score. The processor 320 may create the identified predetermined number of sentences as vector data of the contents and may create learning data including vector data of the created contents.

As an example, the processor 320 may create learning data in which a user query corresponding to vector data of the created contents is one pair. The processor 320 may add a position embedding value for maintaining the sequence of keywords included in the vector data of the created contents, and connect the vector data of the contents and the query of the user to create learning data. The processor 320 may input the created learning data into an AI model to train the AI model.

According to an embodiment, the processor 320 may train the natural language processing-based search model and the AI model, but the natural language processing-based search model and the AI model may be created and trained in a separate external device. For example, the external device may be a search model server or a search model cloud. The processor 320 may create a natural language processing-based search model or train an AI model in association with a search model cloud. The processor 320 may receive a natural language processing-based search model or trained AI model created by the search model server.

The natural language processing-based search model of the processor 320 may extract a keyword from a user query and create a keyword vector based on the extracted keyword. The processor 320 may identify a first similarity between the content indexing data of the natural language processing-based search model and the keyword vector. The processor 320 may obtain a search content candidate group based on the identified first similarity. The search content candidate group may include a plurality of contents based on the first similarity.

The processor 320 may identify a second similarity between the created keyword vector and the vector data of the contents included in the search content candidate group based on the trained AI model. The processor 320 may identify a second similarity for contents included in the search content candidate group. The processor 320 may align the content included in the search content candidate group based on the obtained first similarity and the second similarity.

The output interface 330 may include various output circuitry and output the aligned contents. For example, the output interface 330 may output contents aligned with an image or voice. The output interface 330 may be referred to as an output unit, an output module, or the like.

The electronic device 300 may further include other components and other configurations.

Figure 3:
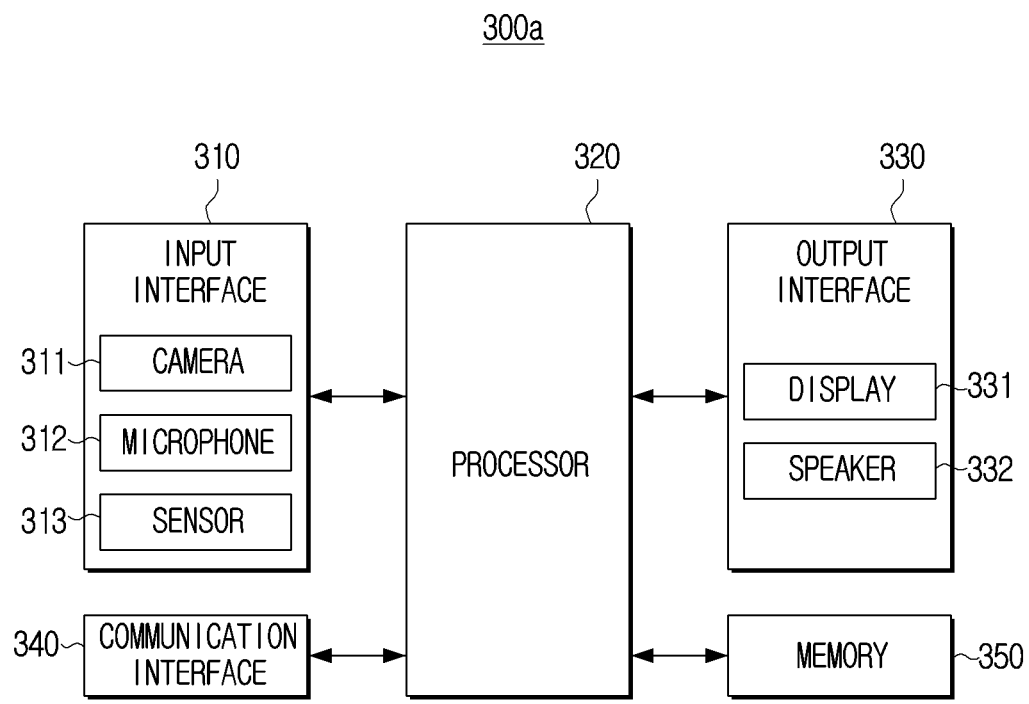
FIG. 3 is a block diagram illustrating an example configuration of an electronic device according to various embodiments.

FIG. 3 is a block diagram illustrating an example configuration of an electronic device according to an embodiment of the disclosure.

Referring to FIG. 3, the electronic device 300a may include an input interface (e.g., including input circuitry) 310, a processor (e.g., including processing circuitry) 320, an output interface (e.g., including output circuitry) 330, a communication interface (e.g., including communication circuitry) 340, and a memory 350. The input interface 310 may include various input circuitry including, for example, a camera 311, a microphone 312, and a sensor 313, and the output interface 330 may include various output circuitry including, for example, a display 331 and a speaker 332. Since the content search process performed in the electronic device has been described in FIG. 2, a repeated description may not be repeated with respect to FIG. 3.

The input interface 310 may include various input circuitry and may receive a query for content searching from a user. For example, the input interface 310 may be implemented as a keypad, a touch pad, or the like. When the input interface 310 is implemented as a keypad, a touch pad, or the like, the input interface 310 may receive a user query input from a keypad, a touch pad, and the like. The input interface 310 may include the camera 311, the microphone 312, or the sensor 313. For example, when the input interface 310 is implemented as the camera 311, the input interface 310 may receive a gesture by a facial expression captured from a user or an action. The processor 320 may identify a user query based on the input gesture. In an embodiment, the camera 311 may include a plurality of cameras and may include a depth camera.

When the input interface 310 is implemented as the microphone 312, the input interface 310 may receive a user's voice. The processor 320 may convert the input speech into text and identify a user query based on the converted text. When the electronic device 300a receives the user's voice, the user's voice may not be accurately identified. Accordingly, the processor 320 may identify the similarity between the text recognized in the input speech and the pre-stored query data. The processor 320 may identify whether the recognized text has an error based on the identified similarity. The processor 320 may modify an error of the identified text when it is identified that there is an error in the recognized text. In an embodiment, the microphone 312 may include a plurality of microphones and may include a directional microphone.

When the input interface 310 is implemented with the sensor 313, the input interface 310 may receive a signal of the remote controller. In an embodiment, the electronic device 300a may display a user interface (UI) such as a virtual key pad, an input window, etc. through the output interface 330. The input interface 310 may receive a signal for selecting a character of a virtual key pad or a signal corresponding to a character input to the input window. The processor 320 may identify a user query based on the input signal. For example, the sensor 313 may include an infrared sensor, an ultrasonic sensor, a thermal sensor, a proximity sensor, a motion sensor, and the like.

The input interface 310 and the output interface 310 may be implemented in one configuration. The input interface 310 and the output interface 310 may be implemented as an input/output interface. In an embodiment, the input/output interface may be implemented as a touch screen, and the electronic device 300a may receive a user query through the touch screen.

The output interface 330 may include various output circuitry and output the searched content. The output interface 330 may include a display 331 and a speaker 332. When the output interface 330 is implemented with the display 331, the output interface 330 may display information on the searched content as text or images. For example, the display 331 may be implemented, for example, and without limitation, as a liquid crystal display (LCD), an organic light emitting diode (OLED), a flexible display, a touch screen, and the like. When the output interface 330 is implemented as the speaker 332, the output interface 330 may output information about the searched content as voice.

The memory 350 may store data for performing the functions of the electronic device 300a, and may store programs, instructions, and the like driven by the electronic device 300a. The memory 350 may store a natural language processing-based search model and a trained AI model. For example, the memory 190 may be implemented as a read-only memory (ROM), a random access memory (RAM), a hard disk drive (HDD), a solid state drive (SSD), a memory card, or the like.

The communication interface 340 may include various communication circuitry and transmit and receive data (or information) with an external device. For example, the communication interface 340 may include a data network communication module including various communication circuitry, such as, for example, and without limitation, LTE, Wi-Fi, Bluetooth, etc., and may communicate with an external device through a local area network and an Internet network. When the electronic device 300a is included in the content search system and performs a content search process with the server, the communication interface 340 may transmit the input user query to the server. The communication interface 340 may receive the content search result performed by the server.

The processor may include various processing circuitry and be configured as one or a plurality of processors, and the processor may be implemented, for example, and without limitation, as a general-use processor such as a central processing unit (CPU), an application processor (AP), a digital signal processor (DSP), a graphics-only processor such as a graphic processing unit (GPU), a vision processing unit (VPU), a dedicated processor, or the like, or an artificial intelligence (AI)-only processor such as a neural processing unit (NPU), or the like. The one or more processors may control processing of the input data according to a predefined operating rule or AI model stored in the memory. If the one or a plurality of processor is an AI-only processor, the processor may be designed with a hardware structure specialized for the processing of a particular AI model.

The predefined action rule or the artificial intelligence model may be formed through training. The forming through training herein may, for example, refer to a predefined action rule or an artificial intelligence model set to perform a desired feature (or object) being formed by training a basic artificial intelligence model using a plurality of pieces of learning data by a learning algorithm. Such training may be performed in a device performing artificial intelligence functions according to the disclosure or performed by a separate server and/or system. Examples of the learning algorithm include, without limitation, supervised learning, unsupervised learning, semi-supervised learning, or reinforcement learning, but are not limited to these examples.

The artificial intelligence model may be configured with a plurality of neural network layers. The plurality of neural network layers may include a plurality of weight values, respectively, and execute neural network operation through an operation result of a previous layer and operation between the plurality of weight values. The plurality of weight values of the plurality of neural network layers may be optimized and/or improved by the training result of the artificial intelligence model. For example, the plurality of weight values may be updated to reduce or to minimize a loss value or a cost value obtained by the artificial intelligence model during the training process. The artificial neural network may include a deep neural network (DNN), and, for example, and without limitation, include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, or the like, but is not limited thereto.

The electronic device 300a may include all the configurations described above or various other configurations. The electronic device 300a may further include other configurations that perform various functions, in addition to the above configurations.

Figure 4:
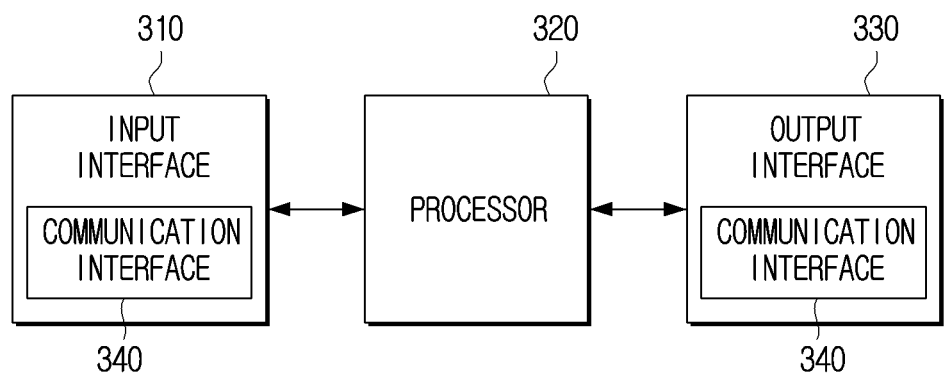
FIG. 4 is a block diagram illustrating an example configuration of an electronic device according to various embodiments.

FIG. 4 is a block diagram illustrating an example configuration of an electronic device according to various embodiments.

Referring to FIG. 4, the electronic device 300b may include an input interface (e.g., including input circuitry) 310, a processor (e.g., including processing circuitry) 320, and an output interface (e.g., including output circuitry) 330. The input interface 310 and the output interface 330 may each include the communication interface (e.g., including communication circuitry) 340. For example, the input interface 310 and the output interface 330 may be implemented with one configuration, and one configuration may be implemented with the communication interface 340. In an embodiment, the electronic device 300b shown in FIG. 4 may, for example, be a server.

As described above, the content search process may be performed solely by the terminal device, and may be performed in a content search system including a terminal device and a server. For example, when a terminal device alone performs a content search process, the electronic device may be a terminal device. The electronic device may include, for example, and without limitation, a digital TV, a desktop computer, a laptop computer, a smart phone, a navigation, a slate PC, a tablet PC, a wearable device, a kiosk, and the like. When a content search process is performed in a content search system, the electronic device may, for example, be a server.

The input interface 310 may include various input circuitry and be provided with a query for searching from a user. For example, if the electronic device 300b is a server and the input interface 310 may be implemented as a communication interface 340, the input interface 310 may receive a query of a user input from an external device (or terminal device).

The processor 320 may create a natural language processing-based search model and train the AI model. In an embodiment, the created natural language processing-based search model and trained AI model may be stored in memory and loaded into the processor 320 if necessary. The electronic device 300b may receive the natural language processing-based model created from the external device and the trained artificial intelligence model via the communication interface 340.

The processor 320 may search content based on the generated natural language processing-based search model, the trained AI model, and the received user query.

The output interface 330 may include various output circuitry and provide a search result. For example, if the output interface 330 is implemented as a communication interface 340, the output interface 330 may transmit the aligned content (or content and alignment information) to an external device (or terminal device).

The configuration of the electronic device performing the content search process has been described. The process of content searching will be described in greater detail below with reference to the drawings.

Figure 5:
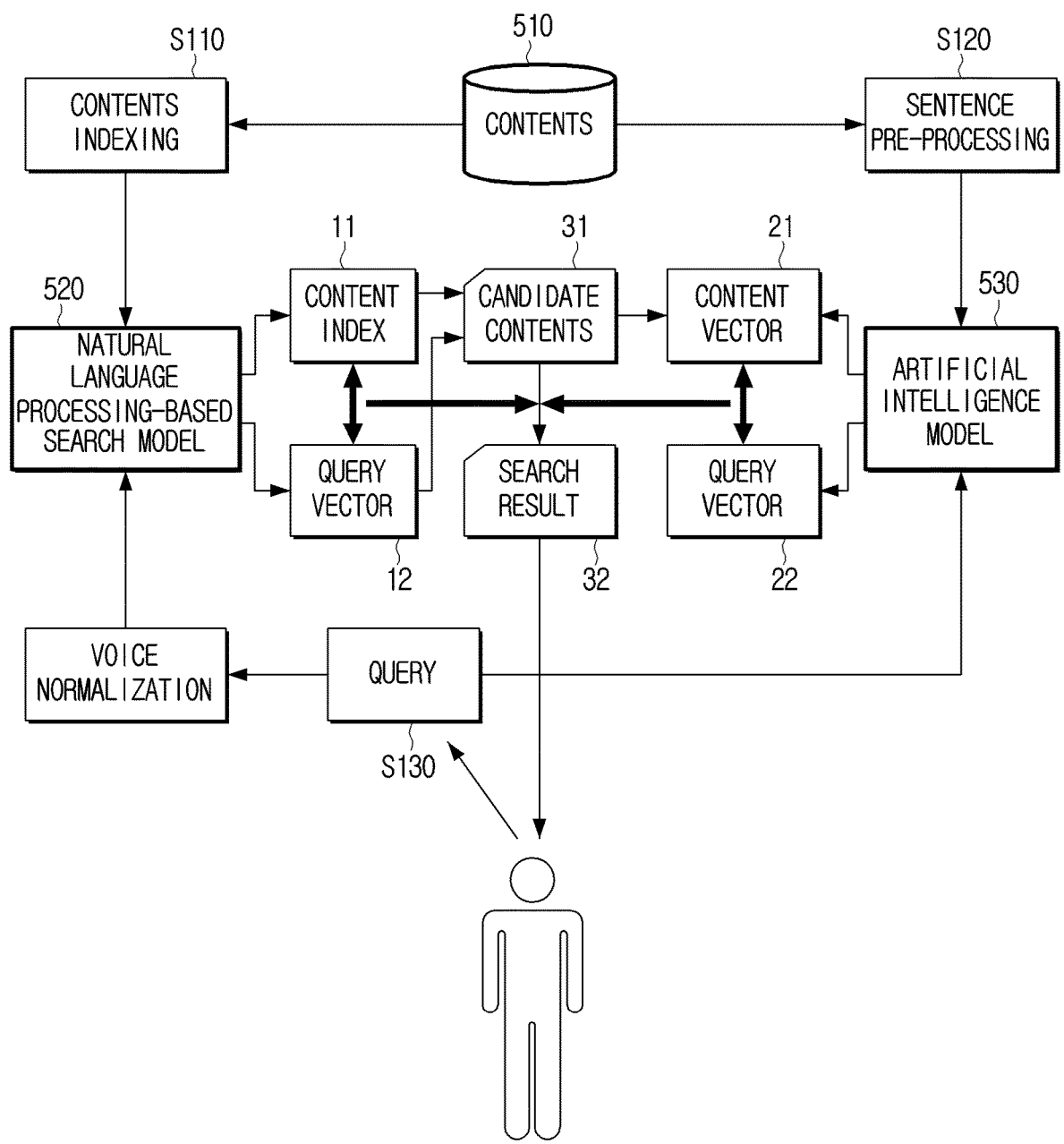
FIG. 5 is a diagram illustrating an example contents searching architecture according to various embodiments.

FIG. 5 is a diagram illustrating an example contents searching architecture according to various embodiments.

As described above, the electronic device (or terminal device) may both perform a content search process. In the case of a content search system including a terminal device and a server, the terminal device and the server may each perform a part of the content search process.

Referring to FIG. 5, the electronic device may create a natural language processing based search model 520 and train an AI model 530. The electronic device may extract (query, selected contents) pairs from the user query log. If the extracted pair is input to the AI model 530, the AI model 530 may learn the information of level of famousness by assigning a weight to the largely selected contents for the query. The electronic device may create the content vector 21 using the trained AI model 530 and create and manage a content index 11 from the natural language processing-based search model. The content vector 21 and the content index 11 may be created in plural according to a plurality of contents. In an embodiment, the natural language processing-based search model may include, for example, and without limitation, a bad-of-word, word2vec, doc2vec, and the like. The AI model may include, for example, and without limitation, embedding from language models (ELMo), bidirectional encoder representations from transformers (BERT), or the like.

The electronic device may create a natural language processing-based search model. For example, if a natural language processing-based search model is a bag-of-word model, the electronic device may use a technique such as term frequency (TF)-inverse document frequency (IDF), BM25, and the like. For example, the electronic device may create a sparse vector for utilizing a bag-of-model. The electronic device may obtain a sentence including information such as title, genre, actor, director, synopsis, and opening date of the contents from the contents stored in the database 510 to create the sparse vector. The electronic device may perform a content indexing process for the obtained sentence in operation S110. According to an embodiment, the electronic device may distinguish each sentence through an open natural language processing (openNLP) library and part of speech (POS) tagging used to process natural language. The POS tagging is meant to remove an unnecessary word class or proposition to leave an important word, and to connect the remaining word with the word class corresponding to the word. The electronic device may extract or remove a word of a required word class through POS tagging. The electronic device may filter unimportant word class among the divided sentences and may extract core concepts (keywords), such as noun, verb, adjective, and the like. The electronic device may obtain a term frequency (TF) of the extracted keyword. The term frequency may refer, for example, to the total number of keywords included in the particular contents. The electronic device may obtain an inverse document frequency (IDF) to identify the importance of the keyword. The inverse document frequency may refer, for example, to the number of content including the keyword.

As an example, a word "abc" may be included in the first content for multiple times. The article such as "a" or "the" may be included multiple times in the content. The word "abc" may not be included in the second content, the third content, and the N$^{th}$ content. Thus, the core concept (or important word) in the first content may be "abc." An article such as "a" or "the" may be included in the second content, the third content, and the N$^{th}$ content multiple times. If the server 200 simply identifies the core concept of the contents only with the term frequency, the article such as "a" or "the" may be identified as a core concept. The server 200 may identify the core concept of the content by considering the term frequency and the inverse document frequency of the keyword together. (Equation 1) is a formula for obtaining an IDF (t) score for the term t.

$$IDF(t) = \log\left(\frac{N}{df+1}\right) \quad \text{(Equation 1)}$$

Here, N may refer, for example, to the number the total contents, and df may refer, for example, to the number of contents where the term t appears.

The electronic device may store a content index 11 including a term frequency and inverse document frequency for keywords to create the natural language processing-based search model.

The content index 11 created through the natural language processing-based search model may, for example, include a structure of the sparse vector. The structure of the sparse vector may be provided by narrowing candidate groups in the entire data set. Therefore, the electronic device mays reduce the number of content to be calculated by deep learning through the natural language processing-based search model, thereby enabling fast search.

The electronic device may train the artificial intelligence model 530. The electronic device may extract (query, selected contents) pairs from query logs of the user. The electronic device may perform a sentence preprocessing process S120 for a sentence included in the content data of the database 510.

The electronic device may obtain text including information such as title, genre, actor, director, synopsis, or opening date of the contents from the database 510 in order to extract an important word from the data of the contents selected by the user. The electronic device may generate a plurality of sentences based on a keyword extracted from the obtained text.

As an example, the electronic device may extract the most important N sentences from the content. For example, the electronic device may distinguish each sentence through a OpenNLP library and POS tagging. The electronic device may filter unimportant word classes, leaving only core concepts (keywords), such as noun, verb, adjectives, and the like. The electronic device may remove unnecessary words through the stopword removal process. That is, the electronic device may remove words that do not include useful information. The electronic device may convert the extracted sentence into a vector using a term frequency and an inverse document frequency algorithm for words included in the title, genre, actor, director, synopsis, and opening date in order to extract the most core sentences related to the corresponding content in the extracted sentence. The electronic device may calculate the similarity between each sentence through cosine-similarity, such as (Equation 2).

$$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}} \quad \text{(Equation 2)}$$

Here, Ai and Bi may refer to elements of each of vector A and vector B.

The electronic device may generate a content graph with each sentence as node and similarity between each sentence as edge weight based on the similarity between each sentence. The electronic device may extract N sentences that have an upper rank of text rank using the TextRank algorithm such as (Equation 3) from the generated graph.

$$WS(V_i) = (1-d) + d * \sum_{V_j \in In(V_i)} \frac{w_{ji}}{\sum_{V_k \in Out(V_j)} w_{jk}} WS(V_j) \quad \text{(Equation 3)}$$

(Equation 3) is an equation for calculating the text rank score WS ($V_i$) of the sentence Vi, where $w_{ji}$ is the value calculated through the weight (Equation 2) between the sentence i and the sentence j, and d is a damping factor that a value adjusts the probability of a random walk required to move to sentences that are not connected to another sentence.

The electronic device may store a file in JSON format which includes the user query (<query>) and extracted sentence information (<sentence>).

The electronic device may perform a fine-tuning deep learning process. The initial AI model may be trained based on general data. Thus, a fine tuning deep learning process may be required for content searching. The electronic device may add a token between a query token and a sentence token from a file in a type of JSON to connect the query token and the sentence token. The electronic device may add a position embedding value to maintain the sequence of words. The electronic device may enter the connected token into the AI model 530 that includes various layers of transformer layers and obtain the results.

The electronic device may receive a query from a user in operation S130. For example, the user may enter a query for content searching by a remote controller, and may input a query for content searching by voice. In an embodiment, the electronic device may extract, from a log stack index, text information included in the sentence parameter from a search request (query) input from a user, for example, by utilizing Elasticsearch query. If the provided query is voice, the electronic device may tune an error in voice recognition. For example, the electronic device may identify the similarity between the text recognized in the provided voice and the pre-stored query data. The electronic device may identify whether the recognized text has an error based on the identified similarity, and tune an error of the identified text. According to an embodiment, the electronic device may automatically tune an incorrectly recognized word, for example by using a Levenshtein distance based on an edit distance that is a number of times of changing a word A to a word B in order to tune an error of voice recognition.

When receiving a user query, the electronic device may perform a POS tagging and a query preprocessing process. The electronic device may perform a POS tagging and a query pre-processing process after tuning an error when an error is included in a query of a user input by a voice. The electronic device may generate a query vector 12 for the user query and compare the similarity with the bag-of-word model-based content index 11. The electronic device may obtain a content candidate group including the candidate content 31 based on the content index 11 and the similarity. According to an embodiment, the electronic device may extract a keyword from an inputted query, and perform a stopword removal process for removing a word, which is not necessary or a keyword, based on a predefined user dictionary. In an embodiment, the content index 11 may be implemented as metadata in the form of a structured document. Each of the plurality of fields of the content index 11 may include data related to information such as a title, a genre, an actor, a director, synopsis, or an opening date. The electronic device may search for content by assigning weights to some fields in a content search process. The electronic device may calculate a score for the entire field using (Equation 4) and extract a content candidate group.

$$BM25F_d = \sum_{t \in q \cap d} \frac{tf(t, d)}{k_1 + tf(f, d)} \cdot idf(t) \quad \text{(Equation 4)}$$

$$tf(t, d) = \sum_{c \in D} w_c \cdot tf_c(t, d)$$

Referring to (Equation 4), BM25 score BM25Fd of content d may be calculated based on the idf(t) which is the inverse document frequency of word t, constant k1 which tunes the effect of tf(t, d), weight we of field c, and tf (t, d) which is the number of t appearing in content d in field c.

The electronic device may use the artificial intelligence model 530 to create a query vector 22 for the user query. The electronic device may compare the similarity between the query vector 22 and the deep learning-based content vector 21 for the content candidate group. The electronic device may aggregate the similarity based on the bad-of-word model and the similarity based on the deep learning model for the candidate content 31 included in the content candidate group. The electronic device may provide the user with the search result 32 based on the aggregated similarity. According to an embodiment, the final similarity score Sc of content c may be calculated using (Equation 5) in consideration of the bag-of-word score Sb for content c and the deep learning score Sd of n passages (e.g., sentences) for content c.

$$S_c = \alpha * S_b + \delta * (1 - \alpha) * S_d \quad \text{(Equation 5)}$$

$$S_c = \alpha * S_b + \delta * (1 - \alpha) * \frac{\sum_{i=1}^{n} p_i}{n}$$

Here, alpha ($\alpha$) may be utilized to tune the weight of Sb and Sd. Delta ($\delta$) represents a boosting factor for tuning impact of a score obtained through deep learning and pi may refer, for example, to the score of passage i of the content c. The pi may be obtained based on the cosine similarity with the query vector 22. The finally obtained search result 32 may be provided to the user in descending order of the Sc score.

Figure 6:
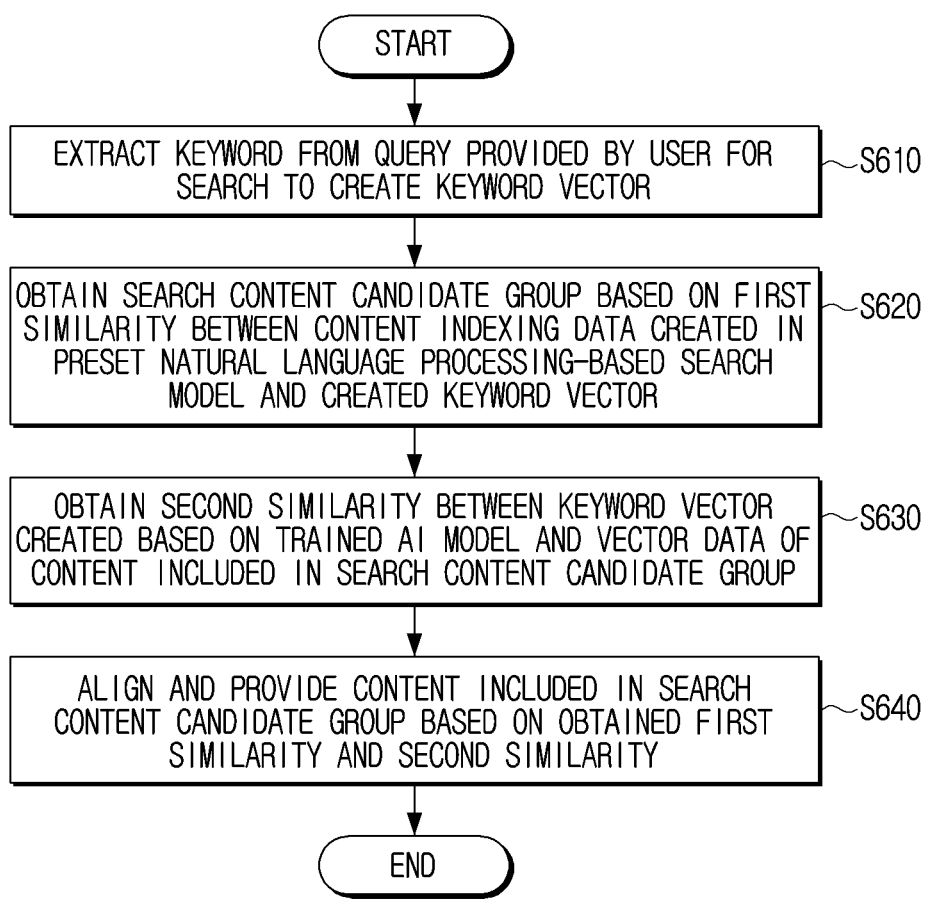
FIG. 6 is a flowchart illustrating an example contents searching method according to various embodiments.

FIG. 6 is a flowchart illustrating an example contents searching method according various embodiments.

Referring to FIG. 6, the electronic device may extract a keyword from a query provided for a search from a user to create a keyword vector in operation S610. If the provided query is provided as a voice, the electronic device may calculate the similarity between the recognized text and the pre-stored query data in the provided voice. The electronic device may identify whether the recognized text has an error based on the calculated similarity, and modify an error of the text.

The electronic device may obtain a search content candidate group based on a first similarity between the content indexing data created in a preset natural language processing-based search model and the created keyword vector in operation S620. The electronic device may create a natural language processing-based search model. For example, the electronic device may obtain text that includes at least one of a title, a genre, an actor, a director, a synopsis, or an opening date. The electronic device may extract the keyword from the obtained text. The electronic device may obtain the term frequency and the inverse document frequency of the extracted keyword. The electronic device may obtain content indexing data based on the obtained term frequency and the inverse document frequency, and create a preset natural language processing based search model. In an embodiment, the content indexing data may include a plurality of fields. The electronic device may obtain a search content candidate group by applying a weight to at least one field of the plurality of fields.

The electronic device may obtain a second similarity between the created keyword vector based on the trained AI model and the vector data of the content included in the search content candidate group in operation S630. The electronic device may calculate the similarity with the query provided for the contents included in the search content candidate group. In addition, the electronic device may train an AI model. For example the electronic device may obtain a text comprising information of at least one of a title, genre, actor, director, synopsis, or opening date of contents, create a plurality of sentences based on a keyword extracted from the obtained text, calculate a score based on a similarity between the plurality of created sentences, identify a preset number of sentences in which the calculated score is high (e.g., higher than a specified threshold), create the preset number of identified sentences as vector data of the contents, and train the artificial intelligence model based on learning data comprising vector data of the created contents. The learning data may be generated as a pair of queries corresponding to vector data of the created content. In addition, the learning data may include a position embedding value for maintaining the sequence of keywords included in the vector data of the created content, and a token for connecting the vector data of the content and the query of the user.

The electronic device may align and provide content included in the search content candidate group based on the obtained first similarity and the second similarity in operation S640.

Figure 7:
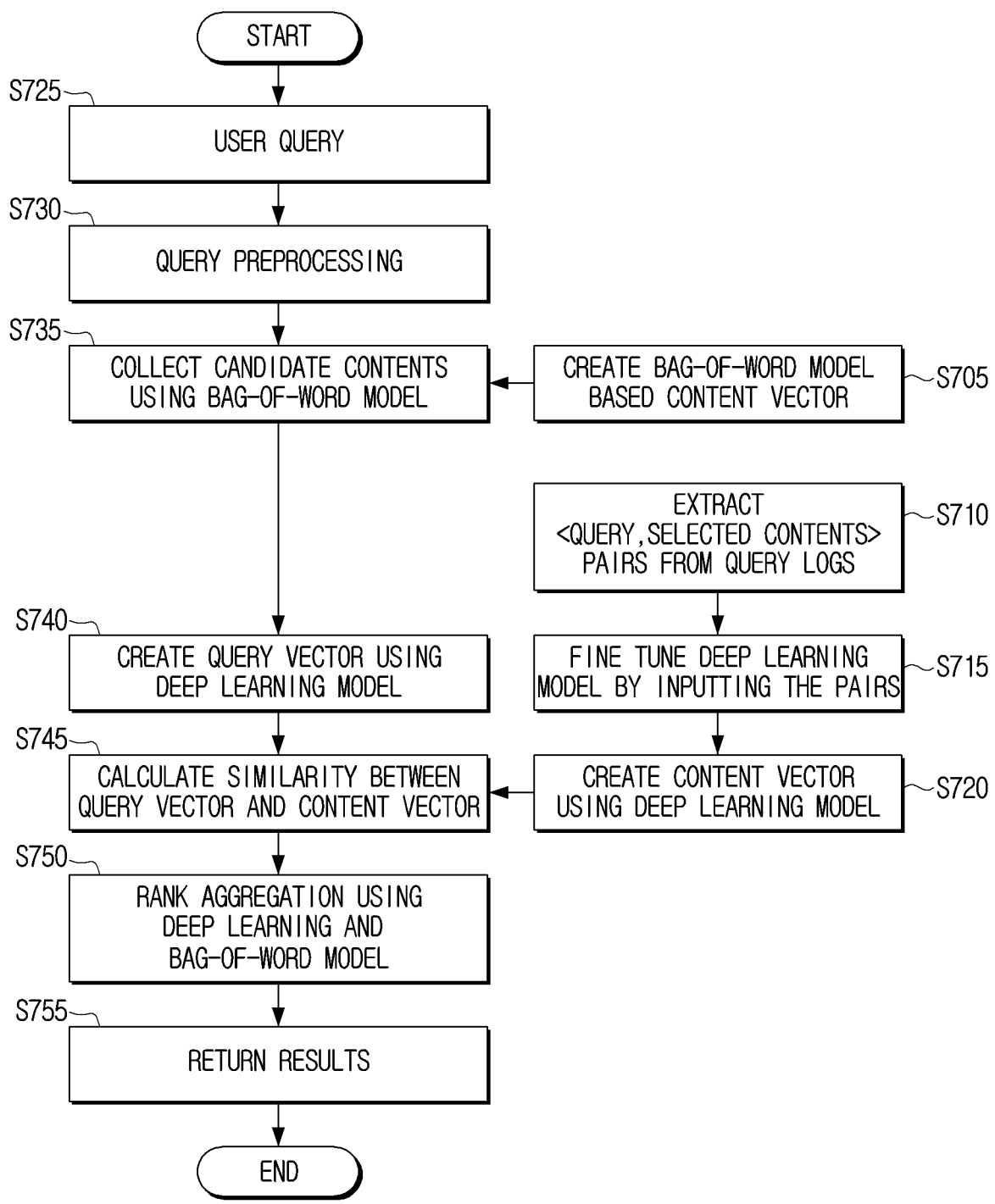
FIG. 7 is a flowchart illustrating an example process of creating a model and searching for contents according to various embodiments.

FIG. 7 is a flowchart illustrating an example process of creating a model and searching for contents according to various embodiments.

Referring to FIG. 7, the electronic device may create the bag-of-word model based on the content vector in operation S705. For example, the electronic device may obtain a sentence including information such as a title, genre, actor, director, synopsis, opening date of the contents, or the like, and may divide each sentence. The electronic device may extract a keyword and calculate a term frequency and inverse document frequency. The electronic device may store a content index including a term frequency, inverse document frequency for a keyword and create a natural language processing-based search model.

The electronic device may extract (query, selected contents) pairs from the query log in operation S710. The electronic device may extract a keyword from the selected content and may create a plurality of sentences. The electronic device may create learning data in the format of the pairs of the user query and extracted sentence information.

The electronic device may perform a fine tuning deep learning process with the input pair in operation S715. The electronic device may add a token that connects a query token and a sentence token from the data in the form of the pair of the user query and the extracted sentence information. The electronic device may add a position embedding value to maintain the sequence of words. The electronic device may train an AI model based on the learning data. The electronic device may create a content vector using a deep learning model in operation S720.

The electronic device may receive a user query in operation S725, and may perform a preprocessing process on the user query in operation S730. The electronic device may obtain candidate contents using the bag-of-word model in operation S735. The electronic device may obtain candidate content based on similarity between content indexing data created in a natural language processing-based search model and a keyword vector created from an inputted query.

The electronic device may create a query vector using an AI model in operation S740, and calculate the similarity between the query vector and the content vector in operation S745. The electronic device may rank aggregation of the similarity calculated using an AI model and a bad-of-word model in operation S750. The electronic device may obtain a first similarity between the created keyword vectors based on the contents indexing data created in the natural language processing-based model and the input user query, obtain a second similarity between the created keyword vector and vector data included in the searching contents candidate group based on a trained artificial intelligence model. The electronic device may aggregate the first similarity and the second similarity, and may align the contents included in the searching contents candidate group based on the aggregated similarity. The electronic device may provide a search result to a user in operation S755.

The disclosure may extract and learn level of famousness of contents from the search log of the user even there is no provision of level of famousness (awareness) from the outside. Therefore, the disclosure may provide a user with famous contents sequentially.

The content search method according to various embodiments may be provided as a computer program product. The computer program product may include a software (S/W) program or a non-transitory computer readable medium in which the S/W program is stored.

The non-transitory computer-readable medium semi-permanently stores data and is available of reading by the device. For example, programs of performing the above-described various methods can be stored in a non-transitory computer readable medium such as a CD, a DVD, a hard disk, a Blu-ray disk, universal serial bus (USB), a memory card, ROM, or the like, and can be provided.

While the disclosure has been illustrated and described with reference to various example embodiments, it will be understood that the various example embodiments are intended to be illustrative, not limiting. In other words, the disclosure is not limited to the specific embodiments described above. It will be understood by those skilled in the art that various changes in form and detail may be made without departing from the true spirit and full scope of the disclosure, including the appended claims and their equivalents.

What is claimed is:

1. A method for searching contents, the method comprising:
creating a content index using a natural language processing-based searching model to index content;
creating a keyword vector by extracting a keyword from a search input;
obtaining a candidate contents group based on a first similarity between the content index and the keyword vector;
creating a content vector for the candidate contents group using an artificial intelligence model trained using learning data from a user search log in which queries and contents corresponding to the respective queries are paired;
obtaining a second similarity between a query vector created by the artificial intelligence model based on the search input and the content vector; and
aligning and providing contents included in the candidate contents group based on the first similarity and the second similarity.

2. The method of claim 1, further comprising:
obtaining text comprising information of at least one of a title, genre, actor, director, synopsis, or opening date of contents;
extracting a keyword from the obtained text;
obtaining term frequency and inverse document frequency of the extracted keyword; and
creating the natural language processing-based searching model by obtaining the content index based on the obtained term frequency and the inverse document frequency.

3. The method of claim 2, wherein the content index comprises a plurality of fields, and
wherein the obtaining the candidate contents group comprises assigning a weight to at least one field among the plurality of fields.

4. The method of claim 1, further comprising:
obtaining text comprising information of at least one of a title, genre, actor, director, synopsis, or opening date of contents;
creating a plurality of sentences based on a keyword extracted from the obtained text;
calculating a score based on a similarity between the plurality of created sentences;
identifying a preset number of sentences in which the calculated score is at least as high as a preset threshold;
creating the preset number of identified sentences as vector data of the contents; and
training the artificial intelligence model based on learning data comprising the vector data of the contents.

5. The method of claim 4, wherein the training of the artificial intelligence model comprises:
adding a position embedding value to maintain an order of a keyword included in the vector data of the contents; and
inputting, to the artificial intelligence model, learning data connecting the vector data of the contents and the queries.

6. The method of claim 1, wherein the creating of the keyword vector comprises, based on the search input being a voice:
identifying an error of recognized text based on similarity between text recognized in the voice and prestored query data; and
modifying an error of the recognized text.

7. An electronic device comprising:
an input interface comprising circuitry configured to receive a search input;
an output interface comprising output circuitry; and
memory storing instructions, configured to be executed by one or more processors, for controlling the electronic device to perform operations comprising:
creating a content index using a natural language processing-based searching model to index content;
creating a keyword vector by extracting a keyword from the search input,
obtaining a candidate contents group based on a first similarity between the content index and the keyword vector,
creating a content vector for the candidate contents group using an artificial intelligence model trained using learning data from a user search log in which queries and contents corresponding to the respective queries are paired,
obtaining a second similarity between a query vector created by the artificial intelligence model based on the search input and the content vector,
aligning contents included in the candidate contents group based on the first similarity and the second similarity, and
controlling the output interface to provide the aligned contents.

8. The electronic device of claim 7, comprising memory storing instructions, configured to be executed by one or more processors, for controlling the electronic device to perform operations comprising:
obtaining text comprising information of at least one of a title, genre, actor, director, synopsis, or opening date of contents, extracting a keyword from the obtained text, obtaining term frequency and inverse document frequency of the extracted keyword, and creating the natural language processing-based searching model by obtaining the content index based on the obtained term frequency and the inverse document frequency.

9. The electronic device of claim 8, wherein the content index comprises a plurality of fields, and
wherein the electronic device comprises memory storing instructions, configured to be executed by one or more processors, for controlling the electronic device to perform operations comprising assigning a weight to at least one field among the plurality of fields.

10. The electronic device of claim 7, comprising memory storing instructions, configured to be executed by one or more processors, for controlling the electronic device to perform operations comprising:
obtaining text comprising information of at least one of a title, genre, actor, director, synopsis, or opening date of contents,
creating a plurality of sentences based on a keyword extracted from the obtained text,
calculating a score based on a similarity between the plurality of created sentences,
identifying a preset number of sentences in which the calculated score is high, creating the preset number of identified sentences as vector data of the contents, and training the artificial intelligence model based on learning data comprising the vector data of the contents.

11. The electronic device of claim 10, comprising memory storing instructions, configured to be executed by one or more processors, for controlling the electronic device to perform operations comprising:

adding a position embedding value to maintain an order of a keyword included in the vector data of the contents; and inputting, to the artificial intelligence model, learning data connecting the vector data of the contents and the queries.

12. The electronic device of claim 7, comprising memory storing instructions, configured to be executed by one or more processors, for controlling the electronic device to perform operations comprising, based on the search input being a voice:

identifying an error of recognized text based on similarity between text recognized in the voice and prestored query data; and modifying an error of the recognized text.

13. A contents searching system comprising a terminal device and a server, wherein the terminal device comprises circuitry configured to receive a search input and transmit the search input to the server; and the server is configured to receive the search input from the terminal device, wherein the server is further configured to:

create a content index using a natural language processing-based searching model to index content;

create a keyword vector by extracting a keyword from the search input, obtain a candidate contents group based on a first similarity between the content index and the keyword vector, create a content vector for the candidate contents group using an artificial intelligence model trained using learning data from a user search log in which queries and contents corresponding to the respective queries are paired, obtain a second similarity between a query vector created by the artificial intelligence model based on the search input and the content vector, align contents included in the candidate contents group based on the first similarity and the second similarity, and transmit the aligned contents to the terminal device, wherein the terminal device is further configured to output the aligned contents received from the server.

* * * * *